Nov. 25, 1947.    G. A. LYON    2,431,338
ORNAMENTAL TRIM RING FOR VEHICLE WHEELS
Filed March 30, 1946

Inventor
GEORGE ALBERT LYON
by *[signature]* Attys.

Patented Nov. 25, 1947

2,431,338

UNITED STATES PATENT OFFICE 2,431,338

ORNAMENTAL TRIM RING FOR VEHICLE WHEELS

George Albert Lyon, Allenhurst, N. J.

Application March 30, 1946, Serial No. 658,503

5 Claims. (Cl. 301—37)

1

This invention relates to a wheel cover structure and more particularly to a composite plastic and metal cover assembly together with novel retaining means therefor.

An object of this invention is to provide a simple but efficient retaining means for a cover especially adapted for use with a plastic wheel cover.

Another object of this invention is to provide a retaining ring for a wheel cover which can carry spring clips for holding itself on the wheel as well as for holding the cover on the wheel.

Yet another object of this invention is to provide a wheel trim or cover assembly with retaining means which can take advantage of the usual wheel openings in the retention of the cover on the wheel.

In accordance with the general features of this invention there is provided in a cover structure for a wheel including multi-flange tire rim and load bearing parts separated at spaced intervals to provide wheel openings, a circular plastic wheel cover for one of the parts having a margin provided with a turned edge and an annular metallic retaining ring comprising a hollow bead with an outer turned edge nested on said edge of the cover for pressing the cover toward the wheel and carrying spring clips inserted behind the radially inner curved edge of the bead and extending into the wheel openings to clamp the ring against the cover and to hold the cover and ring in assembled relation on the wheel.

Still other features of the invention relate to the construction of the spring clip and the manner in which it is retained in position by the ornamental and annular retaining bead on the inner margin of the main cover.

Other objects and features of this invention will more fully appear from the following detailed description taken in connection with the accompanying drawings which illustrate several embodiments thereof and in which—

Figure 4 is a fragmentary sectional view similar to Fig. 2 but illustrating a modified form of

Figure 1:
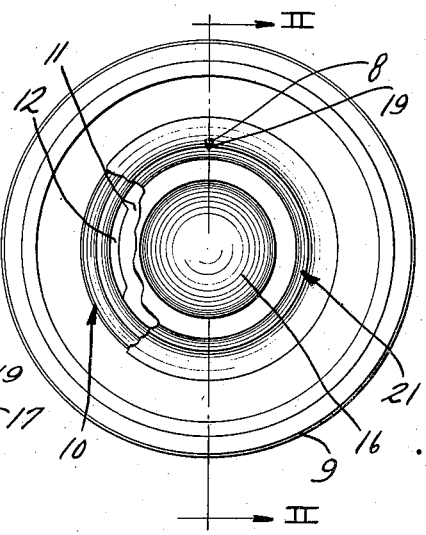
Figure 1 is a side view of a wheel structure having a cover assembly embodying the features of this invention and wherein the cover is partly broken away to illustrate a wheel opening therebehind.

2 connection between the spring clip and the inner annular bead of the cover assembly.

As shown on the drawings:

The reference character 9 designates generally a conventional pneumatic tube and tire assembly mounted in the usual way upon the stepped flanges of a multi-flange drop center type of tire rim 10. This rim is of the type now well known to the automotive industry and is carried in the usual way by a load bearing or body part 11 which comprises a dished metallic stamping.

Portions of the body part 11 are turned rearwardly at 13 to provide the outer margin of the body part adjacent its junction with the rim part with a plurality of circumferentially spaced wheel openings 12. These openings, as is also well known in the art, permit of the circulation of air through the wheel.

The central portion of the bulged body part 11 is recessed and formed into a bolt-on flange 14 adapted to be attached in the usual way to a part of an axle by wheel bolts or cap screws (not shown).

Secured to the flange 14 are a plurality of spaced spring clips 15 which are of the usual inverted type and are cooperable with the under turned edge of a metallic hub cap 16 for the purpose of detachably holding the cap on the wheel in a manner well known in the art.

The present invention is particularly concerned with the provision of a wheel cover 17 for disposition opposite the outer surfaces of side flanges of the rim part 10. This trim ring 17 may be made of any suitable sheet material such as stainless steel although I preferably contemplate making it of synthetic plastic material such as ethyl cellulose, cellulose acetate or vinyl resins.

The outer edge 18 of the trim ring 17 is adapted to abut an outer edge of the tire rim part 10 in close proximity to the outer side wall of the tire 9. This trim ring 17 extends convexly radially and axially inwardly from the turned edge 18 to a point adjacent the wheel opening 12. An intermediate portion of the ring 17 is provided with an opening 19 through which the usual valve stem 8 of the tire and tube assembly 9 can project.

The inner radial margin of the trim ring 17 is turned at 20 so as to provide a turned edge in which an annular outer bead 21 is adapted to seat. More specifically, the annular hollow bead 21 has a turned outer edge 22 which is nested in the turned radially inner edge 20 of the trim ring 17.

This ring 21 which constitutes a cover retaining ring may be made of any suitable sheet material but is preferably made of stainless steel so that it can have a high lustrous external finish.

The radially inner margin of the ring 21 is turned at 23 for the purpose of retainingly cooperating with spring clips 25.

Figure 2:
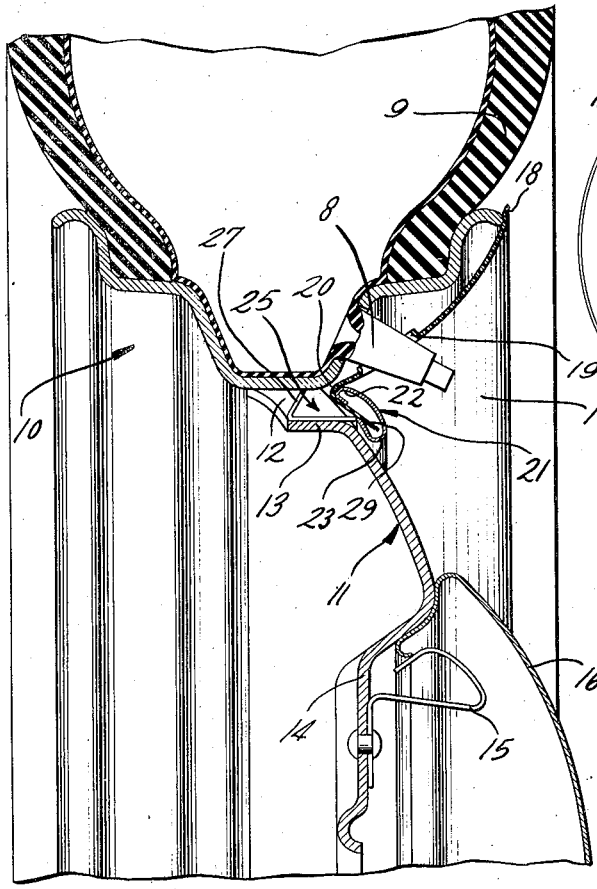
Figure 2 is an enlarged fragmentary cross sectional view taken on substantially the line II—II of Fig. 1 looking in the direction indicated by the arrows.
Figure 3:
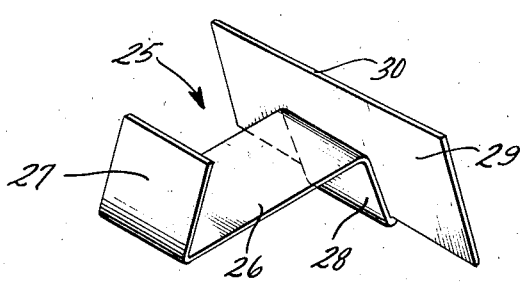
Figure 3 is an isometric view of one of the spring clips shown in Fig. 2.

The clips correspond in number to the wheel openings 12 and may be three to five in number depending upon the number of wheel openings. The clips are all identical in construction and one of them is illustrated in Fig. 3. Each clip includes an axially projecting portion 26 adapted to extend into the wheel opening 12 and terminating in an inclined finger 27 for wedge retaining engagement with the base flange of the rim part as shown in Fig. 2. The axially outer end of the portion 26 is offset radially inwardly at 28 and then is turned back upon itself into an enlarged flange portion 29. The turned back portion 28 of the clip is adapted to be seated behind the turned inner edge 23 of the bead 21 inside of this bead or ring. The outer edge 30 of the enlarged flange portion 29 extends generally radially outwardly opposite the wheel opening 12 (Fig. 2) and defines a seat for the inner turned edge 20 of the wheel cover 17.

The turned or double backed portions 28 and 29 of each clip is adapted to be readily inserted inside of the hollow bead or ring 21 and engage behind the edge 23 of the bead.

In the assembly of this composite plastic and metal cover the bead is positioned over the inner margin 20 of the plastic ring 17 and the clips are inserted in the hollow bead behind the turned edge 23 thereof. Upon the pressing of the assembly axially inwardly on the wheel with the hole 19 aligned with the valve stem 8, the clips and more particularly their fingers 27 are wedged into engagement with the wheel parts and serve to draw the metal retaining ring 21 tightly against the inner turned margin 20 of the plastic ring 17 to hold both rings on the wheel.

The clips can be easily released from their wedged engagement with the wheel part by inserting a screw driver from the rear side of the wheel and progressively disengaging the fingers 27 from their wedged contact with the base flange of the tire rim part.

There is also an alternative way of mounting the assembly on the wheel and that embraces first partially inserting the clips in position in the wheel opening, then positioning the trim ring 17 with its turned edge 20 resting on the edge portion 30 of the clip flange 29 and then springing the bead 21 or more particularly its turned edge 23 over the projecting portion 28 of each of the clips. When the ring is in position on the clips it will clampingly urge the inner turned margin 20 of the plastic ring tightly against the flange portion 29 of each of the clips.

Figure 4:
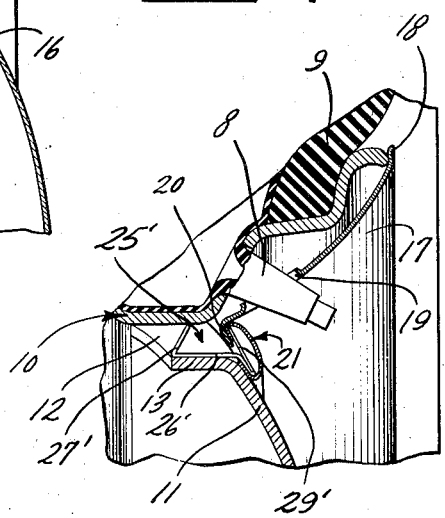

In Fig. 4 I have illustrated a modification of the invention wherein the wheel is identical to that shown in Fig. 2 and hence the same reference characters are used to designate parts common to both figures.

The plastic trim ring and the annular bead 21 are also substantially the same as in the first form.

In this form, however, the clips 25' are attached to the bead 21 in a slightly different manner. Each clip 25' includes an axially extending portion 26' resting on the flange 13 of the body part and an inclined finger 27' in wedged engagement between the two wheel parts. The outer end of the portion 26' is formed with a doubled back flange 29' corresponding to the flange 29 of the first form of clip. In this second form however the flange 29' is disposed wholly within the hollow bead 21 or in other words behind the inner and outer turned edges of the frame.

In this form of the invention the clips are first positioned opposite the openings with their fingers 27' partly in the openings. Then a trim ring 17 is positioned over the rim part 10. Obviously by reason of the fact that the clips 25' are more or less integral components of the hollow bead 21 since they are carried by the bead, the bead will be supported by the clips when the clips are partially mounted in the wheel opening. Hence, upon the pushing of the bead 21 rearwardly it will force the trim ring 17 home into proper wheel covering position in which the turned outer margin of the bead 21 tightly bears against the turned inner margin of the trim ring 17. The ring 21 will be held in this position by reason of the biting action of the fingers 27' on the base part of the tire rim part.

In both forms of the invention it will be perceived that due to the inclination of the finger 27—27' of the clip any tendency of the cover to work loose will result in an enhancement of the biting engagement of the finger. In this way a positive attachment of the trim ring is assured.

Also in both forms of the invention the trim ring 17 is of such convex cross sectional contour as well as of such depth that in appearance it gives the illusion of being a continuation of the side wall of the tire. This appearance can be accentuated by providing the ring 17 with a white external finish in which event it will appear to constitute a white side wall part of the tire 9.

In both forms of the inventon a highly desirable contrast of color can be effected by reason of the fact that the bead 21 lends itself to a lustrous finish. This lustrous bead will tend to cause the trim ring 17 to stand out with reference to the body part 11 which may have an external color to match the body of the vehicle.

I claim as my invention:

1. In a cover structure for a wheel including multi flange tire rim and load bearing body parts separated at spaced intervals to provide wheel openings, an annular wheel cover for one of said parts having a radially inner turned margin, and a retaining ring having an outer margin nested in the cover margin so as to bear thereagainst and carrying a plurality of spring clips projecting into and wedged in said wheel openings to force said ring against said cover margin and to retain both the ring and cover in assembled relation on the wheel.

2. In a cover structure for a wheel including multi flange tire rim and load bearing body parts separated at spaced intervals to provide wheel opening, an annular wheel cover for one of said parts having a radially inner turned margin, and a retaining ring having an outer margin nested in the cover margin so as to bear thereagainst and carrying a plurality of spring clips projecting into and wedged in said wheel openings to force said ring against said cover margin and to retain both the ring and cover in assembled relation on the wheel, each of said clips comprising an axially outer portion having one edge thereof retainingly engaged by said ring and having the other edge formed to define a seat on which said turned margin of the cover is held by said retaining ring.

3. In a cover structure for a wheel including multi flange tire rim and load bearing body parts separated at spaced intervals to provide wheel openings, an annular wheel cover for one of said parts having a radially inner turned margin, and a retaining ring having an outer margin nested in the cover margin so as to bear thereagainst and carrying a plurality of spring clips projecting into and wedged in said wheel openings to force said ring against said cover margin and to retain both the ring and cover in assembled relation on the wheel, said retaining ring comprising a hollow bead with a turned radially inner margin and each of said clips comprising a flange portion inserted behind said turned margin of the bead and held in position by the bead.

4. In a cover structure for a wheel including multi flange tire rim and load bearing body parts separated at spaced intervals to provide wheel openings, an annular wheel cover for one of said parts having a radially inner turned margin, and a retaining ring having an outer margin nested in the cover margin so as to bear thereagainst and carrying a plurality of spring clips projecting into and wedged in said wheel openings to force said ring against said cover margin and to retain both the ring and cover in assembled relation on the wheel, said ring comprising a hollow bead with radially inner and outer turned margins and said clips each having a portion seated in said hollow bead behind its turned margins so as to be retained in position by the ring.

5. In a cover structure for a wheel including multi flange tire rim and load bearing body parts separated at spaced intervals to provide wheel openings, an annular wheel cover for one of said parts having a radially inner turned margin, and a retaining ring having an outer margin nested in the cover margin so as to bear thereagainst and carrying a plurality of spring clips projecting into and wedged in said wheel openings to force said ring against said cover margin and to retain both the ring and cover in assembled relation on the wheel, said ring comprising an annular hollow bead with radially inner and outer turned margins, the outer margin being seated against the margin of the cover and each of said clips including a portion held inside of said hollow bead and a rearwardly projecting portion terminating in an inclined finger for wedged engagement between the wheel parts inside of a wheel opening.

GEORGE ALBERT LYON.